(12) United States Patent
Bailes-Collins et al.

(10) Patent No.: US 12,026,223 B2
(45) Date of Patent: Jul. 2, 2024

(54) METHOD FOR PREFLIGHTING A GRAPHICS ARTWORK FILE

(71) Applicant: Enfocus BV, Ghent (BE)

(72) Inventors: Andrew Bailes-Collins, Ramskapelle (BE); Bert Van Kerckhove, Oostakker (BE)

(73) Assignee: ENFOCUS BV, Ghent (BE)

( * ) Notice: Subject to any disclaimer, the term of this patent is extended or adjusted under 35 U.S.C. 154(b) by 0 days.

(21) Appl. No.: 17/053,986

(22) PCT Filed: Feb. 4, 2020

(86) PCT No.: PCT/EP2020/052769
§ 371 (c)(1),
(2) Date: Nov. 9, 2020

(87) PCT Pub. No.: WO2020/161144
PCT Pub. Date: Aug. 13, 2020

(65) Prior Publication Data
US 2021/0358114 A1    Nov. 18, 2021

Related U.S. Application Data

(60) Provisional application No. 62/800,730, filed on Feb. 4, 2019.

(51) Int. Cl.
*G06F 18/00* (2023.01)
*G06T 7/00* (2017.01)

(52) U.S. Cl.
CPC ............ *G06F 18/00* (2023.01); *G06T 7/0008* (2013.01); *G06V 2201/09* (2022.01)

(58) Field of Classification Search
None
See application file for complete search history.

(56) References Cited

U.S. PATENT DOCUMENTS 5,193,671 A * 3/1993 Patterson ............. B65D 5/5213
206/278
5,963,641 A   10/1999 Crandall et al.
(Continued)

FOREIGN PATENT DOCUMENTS

CN   108416747 A   8/2018
CN   108509631 A   9/2018
(Continued)

OTHER PUBLICATIONS

European Communication pursuant to Article 94(3) for European Application No. 20 703 456.2, dated Aug. 12, 2021, 4 pages.
(Continued)

*Primary Examiner* — Chan S Park
*Assistant Examiner* — Elisa M Rice
(74) *Attorney, Agent, or Firm* — Buchanan Ingersoll & Rooney PC

(57) ABSTRACT

A method and a computer system for preflighting a graphics artwork file. The method includes storing rules corresponding to an object, a set of recognition inputs for identifying the object, and a graphics artwork file to be preflighted. An image is rendered from the graphics artwork file and machine vision identifies a representation of the object in the rendered image, a characteristic of the object, and a value for the characteristic. The identified characteristic value is checked against corresponding values embodied in the rules, and an output of the checking step is provided. The system comprises at least one computer processor, an input, an output, and a plurality of computer memory modules for storing the rules, the recognition inputs, the artwork file, and instructions for performing the rendering, the machine vision, and the checking method.

22 Claims, 2 Drawing Sheets

(56) References Cited

U.S. PATENT DOCUMENTS

| | | | |
|---|---|---|---|
| 10,789,315 B1* | 9/2020 | Zoller | G06F 16/34 |
| 2004/0051682 A1* | 3/2004 | Sines | G09F 13/00 |
| | | | 345/30 |
| 2004/0205656 A1* | 10/2004 | Reulein | G06F 40/154 |
| | | | 715/255 |
| 2006/0260741 A1* | 11/2006 | Crum | G09F 7/00 |
| | | | 156/64 |
| 2007/0083383 A1* | 4/2007 | Van Bael | G06T 11/001 |
| | | | 715/772 |
| 2009/0060396 A1* | 3/2009 | Blessan | G06V 10/50 |
| | | | 382/317 |
| 2009/0196465 A1 | 8/2009 | Menon | |
| 2013/0132273 A1 | 5/2013 | Stiege et al. | |

FOREIGN PATENT DOCUMENTS

| | | |
|---|---|---|
| GB | 2510584 A | 8/2014 |
| JP | 2017138783 A | 8/2017 |
| WO | 2015179757 A1 | 11/2015 |
| WO | 2016105278 A1 | 6/2016 |
| WO | 2019165676 A1 | 9/2019 |

OTHER PUBLICATIONS

International Preliminary Report on Patentability and Written Opinion for International Application No. PCT/ EP2020/052769, dated Aug. 10, 2021, 7 pages.

GlobalVision, "Automated Proofreading for Pharmaceutical Packaging Teams", https://www.globalvisioninc.com/industries/pharmaceutical, retrieved from internet, Jan. 21, 2019, 11 pages.

International Search Report and Written Opinion for International Application PCT/EP2020/052769, dated Apr. 17, 2020, 9 pages.

Chinese Office Action for Chinese Application No. 202080003612.X, dated Apr. 20, 2023 with translation, 11 pages.

* cited by examiner

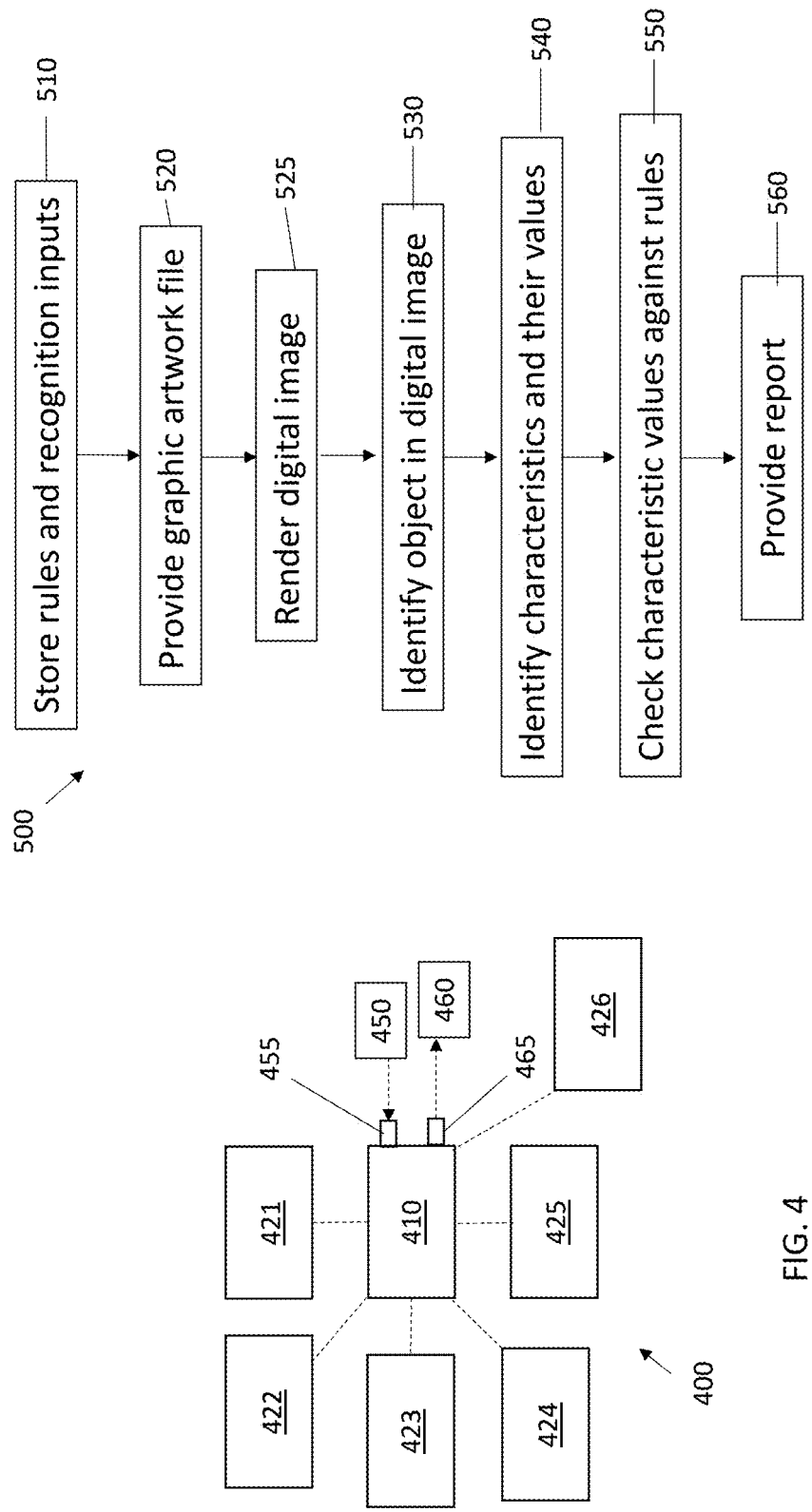

METHOD FOR PREFLIGHTING A GRAPHICS ARTWORK FILE

CROSS REFERENCE TO RELATED APPLICATIONS

This application is a National Phase of PCT Application Ser. No. PCT/EP2020/052769, filed Feb. 4, 2020, which claims priority to U.S. Provisional Application Ser. No. 62/800,730 filed Feb. 4, 2019, both titled METHOD FOR PREFLIGHTING A GRAPHICS ARTWORK FILE, all of which are incorporated herein by reference.

BACKGROUND OF THE INVENTION

In the field of packaging design, each new package design is typically checked against a Corporate Identity/Brand Guideline before going to print, because, for example, brand owners may wish to ensure the latest company logo is used in a design as specified within corporate brand guidelines.

Currently, manual visual checks are performed on a hard copy proof or an electronic soft proof on a screen, against rules or requirements enumerated in a Corporate/Brand Guide. This is a tedious process, and the inherency of human error creates an undesirable error rate.

SUMMARY OF INVENTION

One aspect of the invention is a method for preflighting a graphics artwork file. The comprises storing a set of machine-readable expressions of one or more rules corresponding to one or more objects are stored, each rule relating to at least one predetermined value for a predetermined characteristic of the one or more objects, providing a set of one or more recognition inputs corresponding to one or more features for identifying the one or more objects, and providing a graphics artwork file to be preflighted. One or more images are rendered from the graphics artwork file, and a computer programmed with a set of algorithms for performing machine vision is used for identifying a representation of at least one object in the one or more images rendered from the graphics artwork file. One or more characteristics of the at least one object are identified embodied in (a) the graphics artwork file, (b) the rendering corresponding to the identified representation, or a (c) combination thereof. A value corresponding to the characteristic is determined, and the the value of each of the one or more characteristics identified in the representation is checked against the corresponding predetermined values of the predetermined characteristics embodied in the rules, and an output of the checking step is provided. One or more of the predetermined values may be variable, and received from an external source, such as a workflow system, a manual input, a job ticket, or a database. In some embodiments, the desired design has a structure comprising at least two segments, and in such embodiment, at least one predetermined value of at least one characteristic of at least one object may be different for at least one segment in the structure than the for at least one other segment in the structure. In embodiments in which the structure comprises a multi-page document, each page may comprises one segment. In embodiments in which the structure comprises a package having a three-dimensional structure comprising at least two panels, each panel may comprise a segment.

The method may further comprise modifying the design or the graphics artwork file based upon the output to repair a rule violation, or passing the graphics artwork file to a next step in a workflow for producing a physical product corresponding to the digital image. Modifying the design or the graphics artwork file may comprise automatically substituting a preferred object for an object in violation. In some embodiments, the recognition input may comprise a set of images selected for training an artificial intelligence or pattern recognition algorithm for recognizing the one or more features, and in other embodiments, the recognition input may comprise a text string.

Another aspect of the invention comprises a computer system for preflighting a graphics artwork file. The system comprising at least one computer processor and a plurality of computer memory modules in communication with the at least one computer processor. A first module of computer memory has stored therein a set of machine-readable expressions of one or more rules corresponding to one or more objects, each rule relating to at least one predetermined value for a predetermined characteristic of the one or more objects. A second module of computer memory has stored therein a set of machine-readable expressions corresponding to one or more recognition inputs corresponding to one or more features for identifying the one or more objects. An input port is connected to the computer processor for receiving a graphics artwork file corresponding to a desired design. An output port is also connected to the computer processor. A third module of computer memory is configured for storing the graphics artwork file to be preflighted. A fourth module of computer memory is programmed with machine readable rendering instructions for causing the computer processor to create one or more digitally rendered images from the graphics artwork file. A fifth module of computer memory is programmed with a set of machine readable machine vision algorithms for causing the computer processor to perform machine vision. A sixth module of computer memory is programmed with machine readable instructions for causing the computer processor to perform a plurality of the steps. The steps include rendering the one or more digitally rendered images, reading the one or more digitally rendered images using the machine vision algorithms, identifying a representation of at least one object in the one or more digitally rendered images using the one or more recognition inputs, and identifying one or more characteristics embodied in the graphics artwork file, the rendering corresponding to the identified representation, or a combination thereof. The steps further include, for each identified characteristic, determining a value corresponding to the characteristic, checking the value of each of the one or more characteristics identified in the representation against the corresponding predetermined values of the predetermined characteristics embodied in the rules; and providing an output report via the output port, the output report based upon results of the checking step. The system may include an output device for transmitting, displaying or printing the output report in communication with the output port. An input device may be connected to and in communication with the input port for providing a variable value corresponding to one of the rules, such as a workflow system, a user interface for providing a manual input, or a memory having job ticket information or a database stored therein.

BRIEF DESCRIPTION OF THE DRAWINGS

FIG. 4 is a schematic diagram of an exemplary computer system in accordance with aspects of the invention.

FIG. 5 is a flowchart depicting an exemplary method in accordance with aspects of the invention.

DETAILED DESCRIPTION OF THE INVENTION

Figure 2:
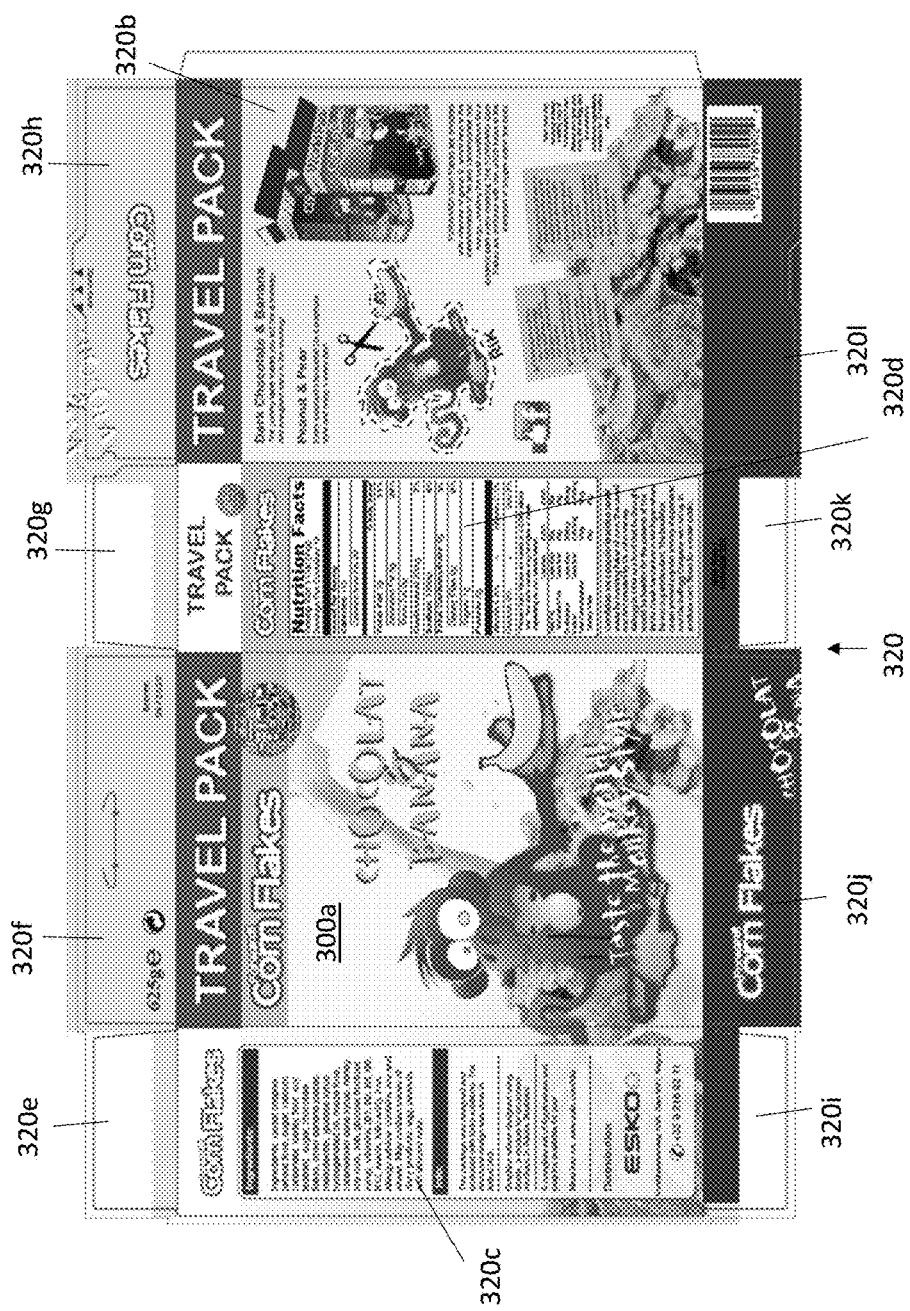
FIG. 2 depicts a digital image of a second exemplary structure, comprising a cereal box, having graphics overlaid on the structure.

Aspects of the invention generally comprise systems and methods for preflighting a graphics artwork file, such as but not limited to a portable document file (PDF) document, a set of images in a standardized file format (e.g. TIFF, PNG, JPEG) or a program-specific (e.g. Adobe Photoshop) format. An exemplary system is depicted schematically in FIG. 4, and an exemplary method is depicted in flowchart 500 of FIG. 5. FIG. 4 depicts a computer system 400, comprising a computer processor 410, a first 421, a second 422, third 423, fourth 424 and a fifth 425 computer memory modules, a computer input port 455 in communication with one or more input devices 450, and a computer output port 465 connected to one or more output devices 460. The inputs and outputs may be any type of ports for receiving by or transmitting data from a computer and may be connected via wired or wireless connections to sources of input information or destinations of output information.

The method generally comprises in step 510, storing in a computer memory (e.g. module 421), as machine-readable expressions, a set of one or more rules (e.g. a branding guideline as set forth in a corporate branding guide, or legal regulations) corresponding to one or more objects (e.g. a company logo, a package design). Each rule relates to at least one predetermined characteristic (e.g. rotation, position, size, and color) of the one or more objects. For example, rules may mandate presence, forbid presence, or mandate or forbid certain characteristics relating to an object. Step 510 also comprises storing in computer memory (e.g. module 422) one or more recognition inputs. Each recognition input may comprise, for example, a set of images that can be used to train an artificial intelligence (AI) or pattern recognition algorithm to recognize a predetermined feature in an image. A recognition input may also comprise a text string that permits detection of a feature based on determining the presence of the text string in the object (e.g. such as identified by optical character recognition (OCR) of text in a rendered image from a graphics artwork file). One or more graphics artwork files are provided in step 520, such as via computer input 450, and stored in third computer memory module 423. The computer processor is also programmed with a set of instructions (e.g. residing in sixth computer memory module 426), that coordinates the processing of information. First, one or more digital images corresponding to a desired design are rendered by the computer system 400 from the graphics artwork file in step 525 pursuant to a set of instructions (e.g. residing in fourth computer memory module 424) for rendering an image. Then, the computer processor 410, programmed with a set of instructions (e.g. residing in fifth computer memory module 425) for performing machine vision, is called upon in step 530 to identify a representation of at least one object in the digital image. In step 540, the computer processor then identifies one or more characteristics embodied in the graphics artwork file, the rendering corresponding to the identified representation, or a combination thereof, and for each identified characteristic (e.g. rotation, position, size (height, width, length), and color) determines a value (e.g., respectively, rotation=90 degrees; position=upper left quadrant centered at coordinate X, Y; height=4 mm; color=blue) corresponding to the characteristic. In step 550, the computer checks the value for each of the one or more characteristics identified in the representation against the corresponding predetermined values of the predetermined characteristics embodied in the rules, and in step 560 provides an output to an output device 460, such as a report of the checking step.

Each module of computer memory 421-426 is in communication with the computer processor 410, and may comprise portions of a single computer memory storage device or may comprise discrete and separate components. For example, module 421 wherein the rules are stored, may be part of a digital asset management system accessible by multiple systems for multiple purposes. It should also be understood that reference to computer processor 410 shall not be interpreted as limiting to a single processor, and that the computer processor may comprise multiple processors. For example, a first processor may be configured for rendering images, a second processor for conducting machine vision, a third processor for conducting preflight checking, and a fourth processor for coordinating all of the various subprocesses. The communication with the computer processor may be a hardwired connection, such as may be present in an integrated desktop computer, computer server, or processing machine, or the communication may be over a computer network, wherein one or more of the processing, memory, or input/output components described herein is located "in the cloud" and connected by some combination of wired and/or wireless connections. The computer memory module for storing the digital image may include a combination of non-volatile memory for longer term storage and volatile memory for shorter term storage, such as RAM for storing the digital image while the machine vision operations are being performed on that image. The output device may be any device known in the art for presenting a computer output, including but not limited to a display, a printer, document creation software for creating a digital document containing the output information, a modem for transmitting digital information to another computer, such as via email, text message, or file sharing, and the like. The invention is not limited to any particular types of computer processors, memory types, inputs, or outputs.

In a specific embodiment, for example, the pages from a PDF file from a designer may be rendered as an RGB TIFF digital image. An exemplary rule may express that a specific version (e.g. Version 2.0) of the company logo shall be used, and may reference a digital asset management system in which a digital representation of the logo is stored. A computer vision based preflight system analyzes the TIFF image to determine if the logo is present. The computer vision system is preferably programmed to determine presence of the logo independent of the background, scaling, color, and rotation of the logo in the image. If the machine vision system detects presence of the logo, it then determines characteristics such as rotation, position, size, color, etc., and then checks values for each characteristic against the brand guidelines. The system generates an output, such as a report to a user of the system, such as a report of adherence to, or infraction against, the corporate/brand guidelines, or the output may be a computer readable output in the form of a signal to move to the next step in the process (if the rules check is complete with no issues identified), or to auto-correct the rule violation (if the rule violation falls within a subset that is auto-correctable). The output is not limited to any particular type of output. An output report may be as simple as a pass/fail or as complex as a detailed trace of the results of every rule check. The output report may be stored in memory, may be output to a file on a storage device, output to a display for viewing on a screen, or output to a printer for printing. The process may further include modifying the design or the graphics artwork file to repair a rule violation based upon the output (such as automatically substituting a preferred object for an object detected to be in violation), or passing the graphics artwork file to a next step in a workflow for producing a physical product corresponding to the digital image.

Exemplary objects may include logos, images, text (e.g. an ingredient or nutrient panel, a health warning, a content statement), barcodes, braille, and CAD data. Exemplary characteristics may include presence or absence of one or more features (e.g. braille, ingredients panel, barcode), size, text content, language o, stylization (e.g. font, bold, italics), color, absolute or relative position, orientation or proportion, and values for one or more parameters (e.g. percentage of recommended daily allowance of a specific nutrient). The images to be checked by the system may include different rendered versions of a file, including rendering of the file with or without CAD information (e.g. specifying structure of the packaging on which the content may be printed, for example), rendering with different color characteristics, rendering of the file with different objects based on colorants or layers, and the like. As used herein, "absolute position" refers to a specific location in the image, whereas "relative position" refers to position of one feature relative to another, or position of a feature relative to another object (e.g. a die line) in the artwork file.

Embodiments of the invention thereby extend the capabilities of prior art preflight solutions by using computer vision techniques to actually "look" at a graphics artwork (e.g. PDF) file and "see" certain issues, using a company's brand guidelines as the criteria for the preflighting. The images rendered from the graphics artwork file may be an RGB image, a composite image with all separations, an image from a single separation, a CIE Lab image, a monochrome gray scale image, or the like, without limitation.

The method may be embodied in a computer software application, such as an application running entirely on a local computer, or a web service embodying non-downloadable software residing "in the cloud," or some combination thereof, depending on specific needs. Although useful in any environment, aspects of the invention may be particularly worthwhile for use in markets in which a set of corporate identity or brand guidelines are important to the print job. Aspects of the invention also may be particularly beneficial for use in fields that have certain legal requirements associated with print jobs, such as those in which the penalties for non-conformance are substantial.

In exemplary aspects of the invention, computer vision is used for checking that certain logos, graphics or images appear, or do not appear in the job. The user may create a 'white list' (information that is desired to be present—e.g. the current form of a corporate logo) or 'black list' (information not desired to be present—e.g. an older form of the corporate logo). Information for use by the processor, such as the foregoing lists, or other characteristics to be detected and checked, may be stored locally or in a distributed asset management (DAM) system. The information may be referenced by a SKU, a customer, or a brand, depending upon specific job requirements. Exemplary embodiments may be particular useful for ensuring that correct logos/graphics are used instead of old ones, and also to ensure that required logos/graphics are in place. Additional functionality available using computer vision techniques may include 'reading' barcodes and braille, and optical character recognition for spell checking. Exemplary embodiments that provide an accurate automated solution are expected to save time, increase accuracy, and reduce deadlines and waste.

Exemplary computer vision embodiments used to identify logos, graphics or images may use techniques such as image/shape matching for detection and extraction of information from the digital image to be analyzed. Optical character recognition may be used for detection of text strings in images. In graphics artwork files that comprise a combination of stored graphics and text (e.g. a PDF), text information (e.g. font, size, style, content), may be extracted from information stored in the graphics artwork file itself, rather than having to extract such information using machine vision from the rendered image, once machine vision identifies the object in the file subject to design rules checking. In addition to the logo itself, further checks may be performed to detect the number of times a particular image appears, the size of the image, and the position. All of the foregoing may be related to brand guidelines and best practices.

The computer vision hardware and software embodied in processor 410 and the machine readable instructions stored in the various memory modules may comprise any systems known in the art or extrapolated from known systems. The technology to detect brand information in digital images using computer vision is known to those of skill in the art, such as is used in high speed production lines using images captured by digital cameras and also for detecting brand presence on television and in online content. Exemplary computer vision systems capable of detecting branding information are made by Orpix Inc. of Huntington Beach, California, USA; GumGum, Inc. of Santa Monica, California, USA; and Ditto Labs Inc., of Cambridge, Massachusetts, USA, such as the methods and systems for identifying brand images within a digital image disclosed in U.S. Patent Application Publication. Nos. US20160012594A1 and US20140019264A1, all of which are hereby incorporated by reference. Exemplary systems useful in applications of the present invention may include artificial intelligence algorithms for "training" the computer vision system.

Machine vision systems, however, have not previously been used as part of the quality control process at the design stage for product packaging to ensure a file meets corporate and legal guidelines before the design is approved for print. While it is known to compare a scanned image of a product sample against a corresponding master file (e.g. a PDF), such as is performed by systems made by Global Vision Inc., of Montreal, Quebec, Canada, embodiments of the present invention do not compare objects against a specific file, but rather against a set of rules based upon corporate and design guidelines.

For example, exemplary corporate branding guidelines may require a minimum amount of clear space framing the logo, separating it from other elements such as headlines, text, imagery, and the outside edge of printed materials. For example, the guidelines may require a clear space that is 2× the width from the graphic element logo to the edge of the outermost edge of the word portion of the logo. Or, for a text-only stylized element 150, the guidelines may require clear space around the text that is 150% of the height or width of the text letters. Other rules that can be distilled from such guidance may include minimum sizes guidelines, relative size guidelines when used in connection with another (e.g. a partner) logo, and font and size specification for the ™ and ® symbols.

In another exemplary example, certain branding guidelines associated with a stylized logo may include a number of "Do's and Don'ts," including the exemplary and non-limiting "Don'ts" set forth below. Exemplary rules may include:

Do not use older versions of the logo;
Do not merge old and new branding elements;
Do not use a version of the logo without specific elements (e.g. the ribbon);
Do not move or reposition elements, such as the ®;
Do not remove or separate elements of the logo;
Do not add elements (additional graphics, shadows, additional strokes, additional outlines);
Do not scale or resize the logo out of proportion;
Do not rotate the logo, except at certain angles (e.g. 90 degrees counterclockwise);
Do not skew, creating a false perspective of, or distort the logo, except in predetermined approved circumstances (e.g. to simulate contours on a bottle);
Do not use in unspecified colors or in unapproved color combinations; and
Do not crop the logo in violation of cropping rules.

Each rule may be distilled to a predetermined value or set of predetermined values against which the detected characteristics of the features may be tested. One or more of the predetermined values for the characteristics may be variable, wherein the value is received from an external source via an input port to the processing system. Exemplary input devices that may serve as the external source include a workflow system, a user interface (e.g. a computer keyboard, a mouse, a voice recognition interface, or any user interface known in the art) for providing a manual input, or a computer memory configured to store information such as a job ticket or a database. The values may be received by the computer input 450 and at least temporarily stored in memory module 420. The values may be a numerical value (e.g. size, spacing), an identity value (e.g. whether the object is identical to a given version), an absolute value (e.g. is some element present or absent), a positional value (e.g. coordinates of location), a relative value (e.g. proportion, comparative size, etc.), or any type of value, without limitation. Of course, for analysis by a machine, each value is typically expressed in machine readable language such a checking step produces either a true or false indication. A false indication can be further evaluated, however, to provide output useful for troubleshooting. For example, a true/false indication that the size of a logo is incorrect, may be accompanied by further information indicating the size is, for example, too small, or too large relative to another logo on the page.

Figure 1:
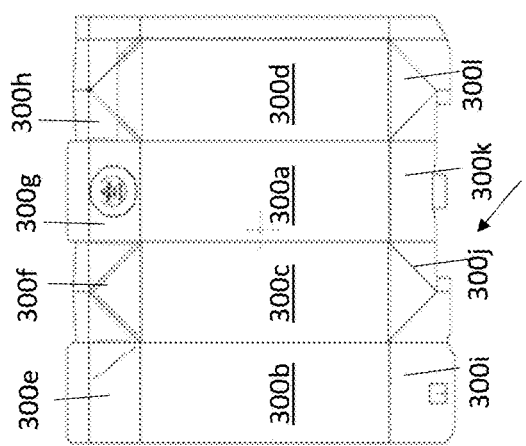
FIG. 1 depicts a digital image of a first exemplary structure in the form of a multi-face packaging box or container.
Figure 3:
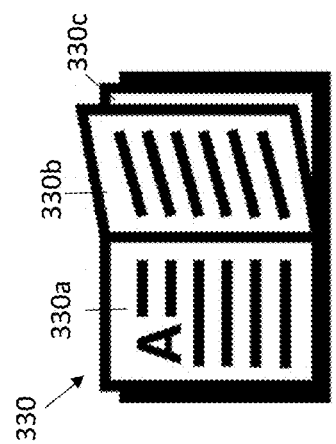
FIG. 3 depicts a digital image of a third exemplary structure in the form of a multi-page document.

In some embodiments, such as that depicted in FIG. 1-3, the desired design may be confined to a structure 300, 320, 330, wherein the structure comprises at least two segments (e.g. rectangular packaging box structures 300, 320 each have a plurality of segments corresponding to each side of the assembled box: a front panel 300*a*, 320*a*, a back panel 300*b*, 320*b*, a left panel 300*c*, 320*c*, a right panel 300*d*, 320*d*, one or more top panels 300*e-h*, 320*e-h*, and one or more bottom panels 300*i-l*, 320*i-l*). In some structures, at least one predetermined value of at least one characteristic of at least one object may be different for at least one segment in the structure than for at least one other segment in the structure. For example, the mandated size of a logo or specific stylized text may be larger for a front face than for a back face of a box. Other structures include a display, a label, or a multi-page document. In a multi-page document 330, such as is depicted in FIG. 3, each page 330*a*, 330*b*, etc. may comprise a segment, and the rules may mandate presence of a logo on the front page 330*a*, but not on later pages 330*b*, 330*c*, etc.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for preflighting a graphics artwork file, the method comprising the steps of:
   a) storing in a computer memory a set of machine-readable expressions of one or more rules corresponding to one or more objects, each rule relating to at least one predetermined value for a predetermined characteristic of the one or more objects, wherein the one or more rules are based upon a set of predetermined guidelines for the one or more objects, the predetermined guidelines comprising corporate, legal, design, or branding guidelines;
   b) providing a set of one or more recognition inputs corresponding to one or more features for identifying the one or more objects;
   c) providing a graphics artwork file to be preflighted;
   d) rendering one or more images from the graphics artwork file;
   e) using a computer programmed with a set of algorithms for performing machine vision, identifying a representation of at least one object in the one or more images rendered from the graphics artwork file;
   f) identifying one or more characteristics of the at least one object embodied in the graphics artwork file, the rendering corresponding to the identified representation, or a combination thereof, and for each identified characteristic, determining a value corresponding to the characteristic;
   g) checking the value of each of the one or more characteristics identified in the representation against the corresponding predetermined values of the predetermined characteristics embodied in the rules, wherein the predetermined values of the predetermined characteristics are independent from a master file of the graphics artwork file; and
   providing an output of the checking step;
wherein the predetermined guidelines include at least one rule that has a first list of information that is desired to be present and a second list of information that is not desired to be present.

2. The method of claim 1, wherein
   the graphics artwork file is configured to be printed as content on a structure comprising physical product packaging or a product label.

3. The method of claim 2, wherein the structure comprises at least two segments.

4. The method of claim 3, wherein at least one predetermined value of at least one characteristic of at least one object is different for at least one segment in the structure than for at least one other segment in the structure.

5. The method of claim 2, wherein the graphics artwork file further comprises CAD data specifying the structure.

6. The method of claim 1, wherein one or more of the predetermined values are variable, and the value is received from an external source.

7. The method of claim 6, wherein the external source comprises a workflow system, a manual input, a job ticket, or a database.

8. The method of claim 1, wherein:
the graphics artwork file corresponds to a desired design, and the desired design has a structure comprising at least two segments;
at least one predetermined value of at least one characteristic of at least one object is different for at least one segment in the structure than for at least one other segment in the structure; and
the structure comprises a multi-page document, wherein each page comprises one segment.

9. The method of claim 8, wherein the structure comprises a package having a three-dimensional structure comprising at least two panels, wherein each panel comprises a segment.

10. The method of claim 9, wherein the package comprises a rectangular box.

11. The method of claim 1, further comprising based upon the output, modifying the graphics artwork file to repair a rule violation, or passing the graphics artwork file to a next step in a workflow for producing a physical product corresponding to the digital image.

12. The method of claim 11, wherein modifying the graphics artwork file comprises automatically substituting a preferred object for an object in violation.

13. The method of claim 1, wherein the recognition input comprises a set of images selected for training an artificial intelligence or pattern recognition algorithm for recognizing the one or more features.

14. The method of claim 1, wherein the recognition input comprises a text string.

15. The method of claim 1, wherein the identifying of the step e) includes identifying a number of times the representation of the at least one object of the one or more objects appears in the one or more images rendered from the graphics artwork file and detecting the size and position of the at least one object.

16. The method of claim 1, wherein the predetermined guidelines include at least one rule that mandates presence of the at least one object in a predetermined location or forbids presence of the at least one object in a predetermined location.

17. The method of claim 1, wherein the identifying of the one or more characteristics of the at least one object embodied in the graphics artwork file in step f) includes identifying a number of times the representation of the at least one object of the one or more objects appears in the one or more digitally rendered images using the one or more recognition inputs and detecting the size and position of the at least one object.

18. The method of claim 1, wherein the predetermined guidelines include at least one rule that mandates presence of the at least one object in a predetermined location or forbids presence of the at least one object in a predetermined location.

19. A computer system for preflighting a graphics artwork file, the system comprising:
at least one computer processor;
a first module of computer memory in communication with the at least one computer processor and having stored therein a set of machine-readable expressions of one or more rules corresponding to one or more objects, each rule relating to at least one predetermined value for a predetermined characteristic of the one or more objects, wherein the one or more rules are based upon a set of predetermined guidelines for the one or more objects, the predetermined guidelines comprising corporate, legal, design, or branding guidelines;
a second module of computer memory in communication with the at least one computer processor and having stored therein a set of machine-readable expressions corresponding to one or more recognition inputs corresponding to one or more features for identifying the one or more objects;
an input port connected to the computer processor for receiving a graphics artwork file corresponding to a desired design;
a third module of computer memory for storing the graphics artwork file to be preflighted;
an output port connected to the computer processor;
a fourth module of computer memory programmed with machine readable rendering instructions for causing the computer processor to create one or more digitally rendered images from the graphics artwork file;
a fifth module of computer memory programmed with a set of machine readable machine vision algorithms for causing the computer processor to perform machine vision;
a sixth module of computer memory programmed with machine readable instructions for causing the computer processor to perform the steps of:
a) rendering the one or more digitally rendered images;
b) reading the one or more digitally rendered images using the machine vision algorithms;
c) identifying a representation of at least one object in the one or more digitally rendered images using the one or more recognition inputs;
d) identifying one or more characteristics embodied in the graphics artwork file, the rendering corresponding to the identified representation, or a combination thereof, and for each identified characteristic, determining a value corresponding to the characteristic;
e) checking the value of each of the one or more characteristics identified in the representation against the corresponding predetermined values of the predetermined characteristics embodied in the rules, wherein the predetermined values of the predetermined characteristics are independent from a master file of the graphics artwork; and
f) providing an output report via the output, the output report based upon results of the checking step;
wherein the predetermined guidelines include at least one rule that has a first list of information that is desired to be present and a second list of information that is not desired to be present.

20. The computer system for claim 19, wherein
the graphics artwork file corresponds to a desired design to be printed as content on a structure comprising physical product packaging or a product label.

21. The computer system of claim 19, further comprising an output device for transmitting, displaying or printing the output report in communication with the output port.

22. The computer system of claim 19, further comprising an input device connected to the input port for providing a variable value corresponding to one of the rules, the input device comprising a workflow system, a user interface for providing a manual input, or a memory having job ticket information or a database stored therein, in communication with the input port.

* * * * *

UNITED STATES PATENT AND TRADEMARK OFFICE
CERTIFICATE OF CORRECTION

| | | |
|---|---|---|
| PATENT NO. | : 12,026,223 B2 | Page 1 of 1 |
| APPLICATION NO. | : 17/053986 | |
| DATED | : July 2, 2024 | |
| INVENTOR(S) | : Andrew Bailes-Collins and Bert Van Kerckhove | |

It is certified that error appears in the above-identified patent and that said Letters Patent is hereby corrected as shown below:

In the Claims

At Column 10, Line 52 (Claim 20), please delete "for" and insert -- of --.

Signed and Sealed this
Thirteenth Day of May, 2025

Coke Morgan Stewart
*Acting Director of the United States Patent and Trademark Office*